March 19, 1963  R. WALTHER ETAL  3,081,938
DEVICE FOR CONTROLLING THE POSITION OF THE DECIMAL
POINT IN ADDING AND CALCULATING MACHINES
Filed June 8, 1961  4 Sheets-Sheet 1

INVENTORS

March 19, 1963 R. WALTHER ETAL 3,081,938
DEVICE FOR CONTROLLING THE POSITION OF THE DECIMAL
POINT IN ADDING AND CALCULATING MACHINES
Filed June 8, 1961 4 Sheets-Sheet 3

INVENTORS
Rolf Walther
Otto Haberkern

United States Patent Office 3,081,938
Patented Mar. 19, 1963

3,081,938
DEVICE FOR CONTROLLING THE POSITION OF THE DECIMAL POINT IN ADDING AND CALCULATING MACHINES
Rolf Walther and Otto Haberkorn, Gerstetten, Wurttemberg, Germany, assignors to Walther Buromaschinen Gesellschaft m.b.H., Gerstetten, Wurttemberg, Germany, a firm
Filed June 8, 1961, Ser. No. 115,697
Claims priority, application Germany June 28, 1960
5 Claims. (Cl. 235—60.15)

This invention relates to a device for determining the decimal point and controlling the position of the impression thereof, in adding and calculating machines and cash registers with decade keyboards, and envisages a simplification and an acceleration of the operation thereof for the case in which two or more amounts have to be recorded in succession which have a different number of digits on the right of the decimal point, as occurs in the recording of summated or non-summated columns of figures or when printing the factors and the product of a multiplication.

In the case of full-keyboard machines, when amounts with different numbers of digits on the right of the decimal point occur it is customary to select a particular position of the decimal point on the keyboard, sufficiently far to the left, and to key the successive amounts, without regard to the number of their decimal digits to the right of the decimal point, with this position of the decimal point.

In the case of machines with a decade keyboard, amounts with varying numbers of digits or places to the right of the decimal point can be keyed with the same position of the decimal point in such manner that the amounts with a smaller number of places to the right of the decimal point than the amount having the greatest number of places to the right of the decimal point are printed with the addition of a sufficient number of noughts. This method of keying, however, requires continuous attention of the machine operator, who must memorise the greatest number of digits occurring on the right of the decimal point and in each case take into consideration the number of noughts to be added. This does not allow of the full utilisation of the capacity or calculation speed of the machine, apart from the fact that, in long calculations, setting errors are practically unavoidable. Further difficulties arise in regard to the decimal point position when the product of a multiplication of two or more factors has to be printed.

In order now to eliminate the difficulties in the setting of a uniform decimal point position in the recording of successive amounts, enumerated above, the invention provides for setting the decimal point position in the set-pin carriage by means of a decimal point setting element determining the position of the decimal point in the set-pin carriage and placed thereon and a setting element determining the position of the decimal point, i.e. the number of places to the right of such decimal point in the printing mechanism, henceforth termed the "place selector"; the last-named having a simultaneously-adjustable stop which is set by the adjustment of the decimal point place-selector at a distance therefrom corresponding to the intended number of places located on the right of the decimal point, while following on the keying of the amount, the set-pin carriage with the preset decimal point locating element is moved up to the aforesaid stop.

This arrangement ensures that, when proceeding to record any number of amounts with different numbers of decimal places to the right of the decimal point it is only necessary to adjust the place-selector to a particular number of places on the right of the decimal point corresponding to the greatest number of decimal places occurring in the amounts to be recorded and then, when recording the amounts, to actuate the decimal point locating element between each two recordings. The amount is thereby recorded automatically with the decimal point in the preselected position without any additional selection or striking of the zero key.

The stop on the place selector is suitably given the form of an adjustable stepped stop bar placed across the set-pin carriage; and the decimal point locating element, the form of a row of decimal point locating pins arranged in the set-pin carriage to the left of the panel containing the digit-setting pins. This row of locating pins is influenced by a decimal-setting key, when at a distance from the previously mentioned stop corresponding to the preselected setting of the place selector.

The set-pin carriage is moved stepwise in the left-hand direction by a spring and is released after an amount has been recorded by keying, in order to move automatically by the requisite number of steps lacking in the preselected number of positions to the right of the decimal point until striking the preselected decimal point locating pin.

The arrangements can be equally well used for addition or subtraction or the simple recording of amounts, as well as for the introduction of multiplication factors.

If, in multiplying machines the fractional part of the product to the right of the decimal point is to be recorded in full without contraction, it is desirable to preset a different position of the decimal point for the product than for the factors, in order to reduce the requisite distance of transverse travel of the set-pin carriage during keying of the amounts.

In order in this case also to eliminate any mental or selective effort of the operator, the decimal point place selector, in conjunction with the decimal point locating element, on the preceding introduction of the factors is automatically reset for the recording of the product to double the number of places on the right of the decimal point. Hence, the decimal point is printed and its position in the product predetermined entirely automatically without any action of the operator, in a location in which the full fractional component of the product is recorded.

For this purpose, the selecting means for the decimal-point type lever is simply moved forward by a driving pawl on the place-selector before printing the product, through the distance of its setting stroke, this motion being arrested by a stepped stop on the place selector lever.

An embodiment of the invention, by way of example, is illustrated in the accompanying drawings which show a self-acting multiplying machine for two factors.

Referring to the drawings.

Figure 1:
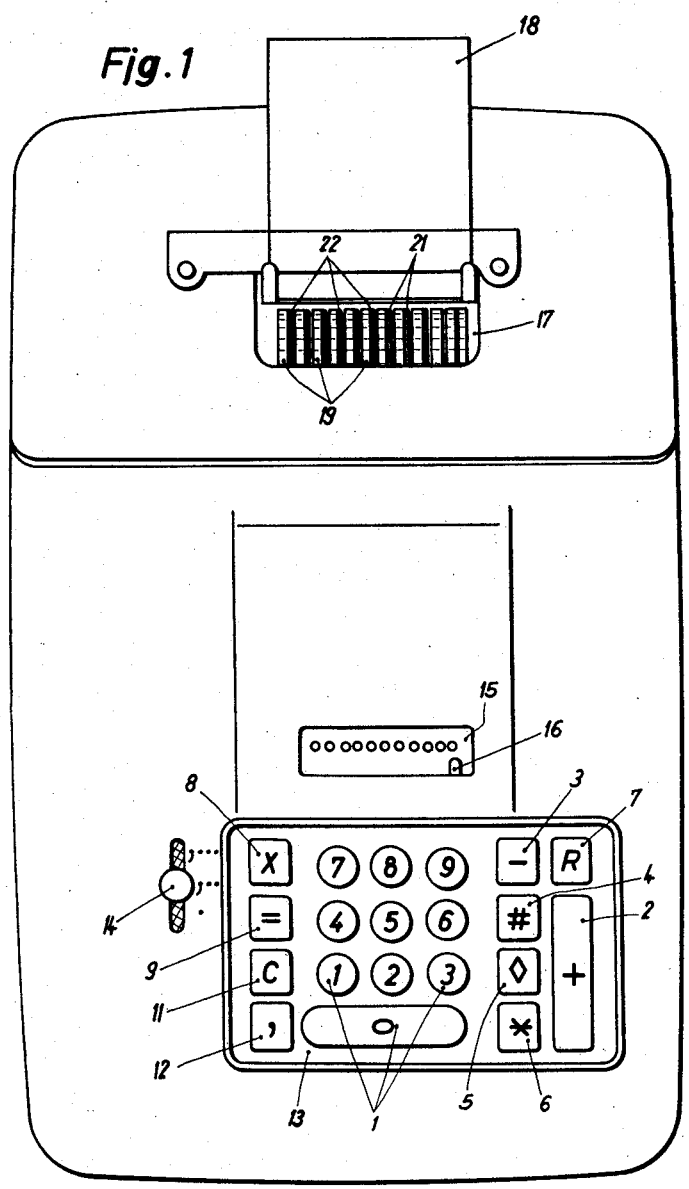
FIG. 1 is a top view of the multiplying machine.

The calculating machine with reference to which the invention will now be explained has a setting mechanism with a bank of ten keys 1 (FIG. 1) with digit keys "1" to "9" and a zero key bar, also, on the right side of the bank of ten keys, one each operating key, for addition 2, subtraction 3, blank or non-print 4, sub-totalling 5, totalling 6 and repetition 7.

On the left hand side are two operating keys for multiplication, viz. one multiplier key 8 (×) for initiating the first step in multiplication, after the first factor (the multiplier) has been keyed on the bank of keys, and a multiplicand key 9 (=) for initiating the second step after the second factor (the multiplicand) has been keyed.

In the second mechanical step, in the calculating machine as used here, the multiplication of the two factors is automatically performed and, on termination of this, the product obtained is automatically printed. Below the operating key 9 is a correction key 11 and below this, a decimal point setting key 21 which will be discussed subsequently.

The keys mentioned up to this stage are assembled on a key board 13. To the left, alongside the keyboard, a position setting lever or place selector lever 14 is provided, the setting of which determines the decimal point position in the impression, i.e. the number of places occurring on the right of the decimal point, and, in fact, the lever in its uppermost setting produces the impression of the decimal point on the left alongside the third digit from the right in the amount and in the following setting position, on the left, alongside the second digit from the right. In the lowest position of the place selector or place selector lever 14 no decimal point is printed.

The totalizer or counting mechanism of the machine is arranged under a cover. Through a window 15 (FIG. 1) above the casing, a position indicator 16 is visible which shows the particular setting of the set-pin carriage. Through a slit or cut-out 17 in the casing the strip of paper 18 passes. The amount type segments 19 also project through it. To the right, alongside each amount key bar a decimal point type lever 21 or a comma key lever 22 is provided.

Figure 3:
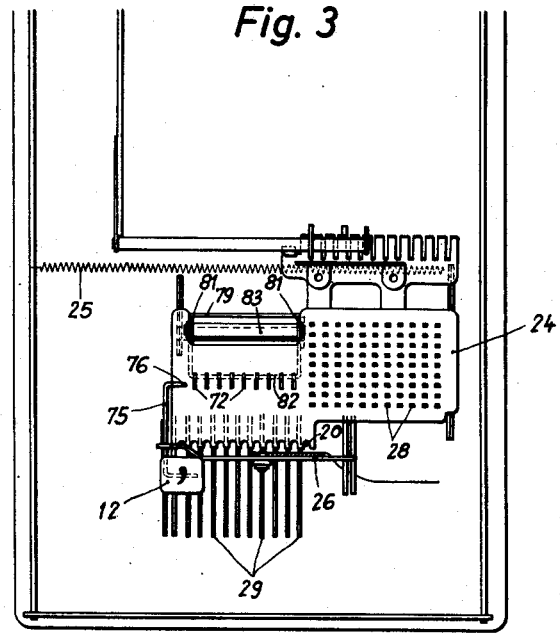
FIG. 3 is a top view of FIG. 2.
Figure 4:
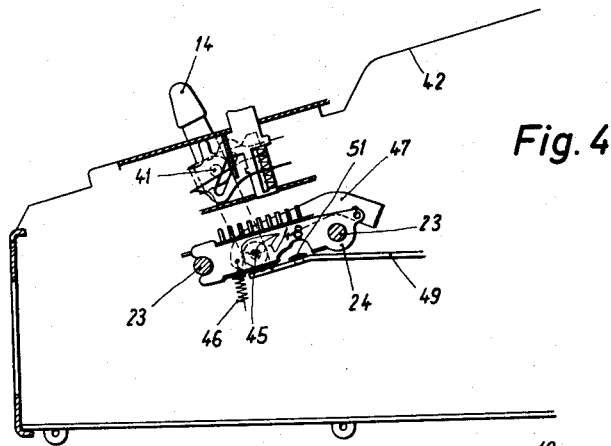
FIG. 4 is a side view of the decimal point type lever, control lever and the associated actuating gears.

The set-pin carriage 24 moving crossway on cross bars 23 (FIG. 4) below the keyboard 13 is moved to the left step by step in known manner by a draw spring 25 (FIG. 6) at each depression of one of the keys in the bank of ten keys by a catch 26, working in conjunction with a rack 20 (FIG. 3) on the set-pin carriage and on termination of the machine cycle is returned again into its resting position by a push rod or lever 27 (FIG. 6) actuated by the machine drive.

The set-pin carriage carries perpendicular rows of setting pins 28 (FIGS. 3, 6) which are moved stepwise over the actuating elements 29 (FIG. 6) movable along the machine. The setting pins 28 moved downwards by depressing the keys 1 limit the motion of the spring operated actuating elements 29 on their release upwards. During the machine cycle the wheels of the counting mechanism or totalizer 31 are actuated further according to the motion of the actuating elements and the type segments 19 connected with the actuating elements 29 are set on the same amount.

Figure 5:
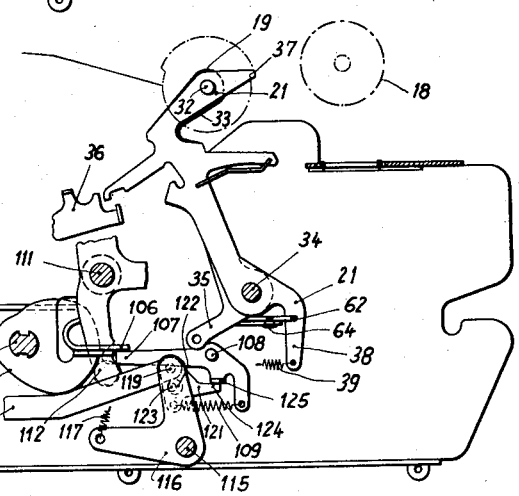
FIG. 5 is a side view of the type mechanism elements associated with the decimal point selecting means.

The amount type segments 19 (FIG. 5) are carried on rocking levers 33 by means of pins 32 which in turn are pivoted on a fixed spindle 34. They are severally controlled by springs, not represented, which engage lower arms 35 and cause them to rotate in a clockwise direction. They are held in the usual manner by locking catches 36 of generally known kind which are therefore not further described, in the resting position shown in FIG. 5 in which the setting of the type segments 19 which are temporarily coupled with the appropriate actuating elements 29 (FIG. 6) to the digits to be printed, takes place. When the rocking levers 33 (FIG. 5) are released at the appropriate instant, they strike with the digit type segment on which they are set on the strip of paper and print the appropriate amount.

The decimal point type lever 21 which carries at the rear end a decimal point type 37 are also pivoted on the axis or spindle 34 and have projections 38 projecting downwards on which tensioning springs 39 act. The release of a decimal point type lever for the impression is dependent on the release of the type segment 19 arranged at the left alongside it, which is essentially known.

Now in order to effect the release of only that decimal point type lever 21 which corresponds to the decimal point position set by means of the place selector lever 14 (FIG. 1) the following connection between the place selector lever 14 and the decimal point type lever 21 is provided.

The place selector lever 14 (FIG. 6) is pivoted on a pin 41 in the left side wall 42 of the machine which is united by means of cross rods 43 with the side wall 44 to form a machine frame. At its lower end it carries a pin 45 (FIG. 4) which coacts with a locking lever 47 loaded by a spring 46 viz. by means of three notches 48 which flexibly hold the place selector lever 14 in its three positions. A setting rail 49 is also connected to the place selector lever 14 by a pin 45 which, at its lower or bottom end (FIG. 6) is connected by a pin 51 to a stop lever 52 which is pivoted on a pin 53. The pin 53 is seated on a bracket 54 fitted on the side wall 42.

At the upper end (FIGS. 6, 7) the setting rail 49 is connected by a pin 55 to a cranked lever 56 which is fitted on a pin 57 fixed on a bracket 58 in the left side wall 42. The upper end 59 (FIGS. 6, 7) of the cranked lever 56 coacts with a pin 61 of a locking plate 62.

Figure 7:
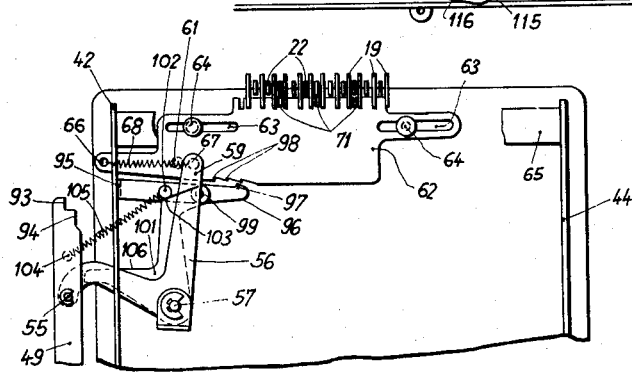

The locking plate 62, the shape of which can clearly be seen from FIG. 7, is placed so that it can be moved crossways by means of slots 63 on pins 64. The pins are fixed on a fillet or band 65 carried by the side walls 42, 44. Between a pin 66 on the locking plate 62 and a pin 67 on the lever 56 a spring is stretched which acts to hold the locking plate 62 at the pin 61 bearing against the upper end of the arm 59 of the lever 56. During the swinging of the cranked lever 56 into one or the other direction by an up and down motion of the setting rail 49, the locking plate 62 is correspondingly moved to the right or the left. The locking plate has at its upper edge (FIG. 7) a row of slits or indentations 71 which coact with the projections 38 (FIG. 5) of the decimal point type lever 21.

If the upper edge of the locking plate 62 (FIG. 7) is in front of the projection 38 of a decimal point type lever 21, then the latter is locked and in spite of release of the type segment lying to the left alongside it, it cannot be imprinted. If, on the other hand, a slit or indentation 71 is opposite a decimal point type lever then if its type segment is released, it is released with it.

With the setting of the locking plate 62 according to FIG. 7 the decimal point type lever 33 arranged at the right alongside the fourth type bar 19 from the right is released by one of the slits or indentations 71 so that the printed decimal point cuts off or separates three places or digits from the right, corresponding to a setting of the place selector lever 14 (FIG. 1) in the uppermost position. If the place selector lever 14 (FIG. 1) is set in its middle position, then the setting rail 49 (FIG. 7) moves one step upwards and the locking plate 62 moves one step to the right so that the decimal point which is printed cuts off two digits or places from the right side of the amount.

Since, in the machine described, only two or three places or digits from the right side of the amount are to be separated by a decimal point, only the two right hand side decimal type levers 21 are provided with decimal point types 37, whereas the levers 22 following on the left carry comma types, instead of the decimal point types, so that in these cases, commas are printed. Since the slits or indentations 71 are separated by intervals of three spaces or digits, in addition to the decimal point, decimal commas are printed at intervals of in each case three places. The device for setting the place location of the decimal point described above is essentially known.

The problem now arises of bringing the particular keyed amount, by means of the set-pin carriage, into a position in which its decimal point position coincides with the decimal point position set by the place selector lever 14. This can, as stated, be brought about by means of the device whereby if necessary, in conjunction with the keying of the amount, a corresponding number of zeros are keyed in addition.

Figure 2:
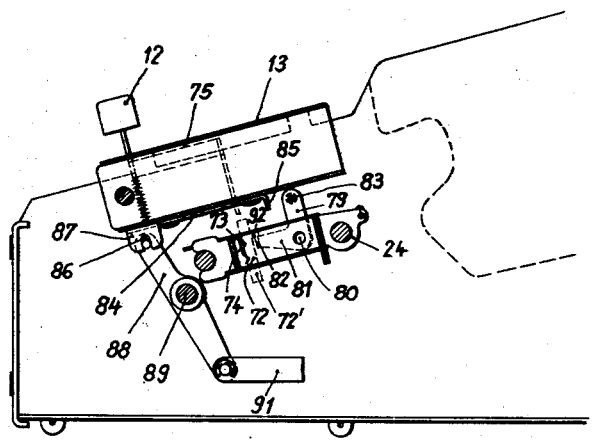
FIG. 2 is a side view of the set-pin carriage and the decimal point selector.

In order to avoid this necessity the set-pin carriage 24 (FIG. 7) is provided, to the left of the panel of the amount setting pins 28, with a row of decimal point setting pins 72 which are movably held perpendicularly in the set-pin carriage 24 (of FIG. 2). On one side, the pins 72 are provided with notches 73 coacting with a locking spring 74 which flexibly holds the pins either in the inoperative upper position shown in FIG. 2 or in a position in which they are moved downwards as shown by the broken lines at 72'.

Figure 6:
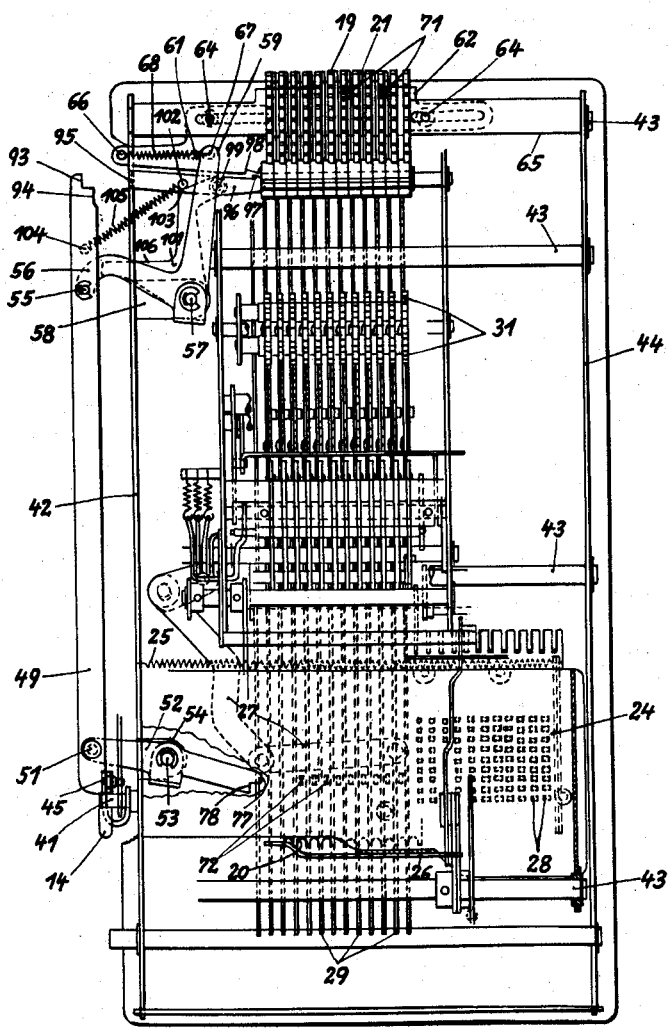
FIG. 6 is a top view of the machine with casing removed and setting mechanism; and, FIG. 7 is a partial view of FIG. 6.

The decimal point setting key 12 (FIG. 2) is provided with a lateral arm 75 which has a finger 76 directed downwards which is arranged in the path of the lateral motion (FIG. 5) of the decimal point setting pins 72. If the key 12 is depressed during the keying of an effective amount, then the decimal point setting pin 72 which is exactly beneath it is moved into its lower effective position in which its lower end lies in the plane of the above cited stop arm or lever 52 (FIG. 6).

The right end of the stop arm or lever has a stepped stop with two stop faces 77, 78. In the rocked position of the stop lever 52 shown in FIG. 6, which corresponds to the middle setting of the place selector lever 14, the particular decimal point setting pin 72 depressed by the decimal point setting key 12 (FIG. 3) is at a distance equal to two motion steps of the set-pin carriage from the stop face 77 (FIG. 6), i.e. after two motion steps of the set-pin carriage, depression of the key 12 causes the depressed decimal point setting pin to strike the stop face 77 and locks the set-pin carriage against further motion. The rows of amount setting pins 28 have been reached a position in which the decimal point position of the keyed amount corresponds with the setting position of the locking plate 62 (FIG. 6) in accordance with the middle position of the place selector lever 14.

If the place selector lever is set in its upper position which corresponds to the position of the locking plate 62 in FIG. 7, then the stop lever 52 (FIG. 6) is swung through one step in the counterclockwise direction so that the stop face 78 lies in the direction of the row of decimal point setting pins 72 and accordingly, the set-pin carriage on depression of the decimal point key 12 can move through three steps and is then held.

After depression of the decimal point setting key 12, the set-pin carriage on each keying of the digits for the places to the right of the decimal point moves in each case one further step nearer to the stop 77 or 78 respectively. If fewer digits are keyed after the decimal point setting key 12 has been pressed than corresponds to the setting of the position setting lever 14 and if in connection therewith the catch 26 (FIGS. 3, 6) is raised from the rack 20 of the set-pin carriage, then the set-pin carriage is released from the pull of its spring 25 until it strikes with the set decimal point setting pin on the stop 77 or 78 respectively.

If, for instance, the multiplication $$1.375 \ kg \times 1.25 = 1.71875 \ DM$$

is to be performed, then selector lever 14 (FIG. 1) is set on the greatest number of places to the right of the decimal point occurring in the factors, i.e. three places. Then, to introduce the first factor (1.375), the digit key "1" is pressed and then the decimal point setting key 12 and subsequently the three digit keys to the right of the decimal point are pressed, so that after depressing the decimal point key 12, the set-pin carriage is moved three steps to the left and the adjusted decimal point setting pin 72 (FIG. 6) has reached the set stop 78.

Then the operating or function key 8 (FIG. 1) is pressed. In the mechanical process thereby initiated, the catch 26 (FIG. 6) is disengaged from the rack 20 so that the set-pin carriage is released for an automatic movement towards the left. Since the set decimal point setting pin is already lying against the stop 78, i.e. the set-pin carriage is already in the position corresponding to the setting position of the place locating lever 14, it does not make a further movement to the left. The transfer of the amount contained in the set-pin carriage to the amount type segments 19 and finally the printing of the first factor with the decimal point to the left of the first three places from the right then follow. Thereupon the set-pin carriage is returned to its starting position by the return push rod or lever 27 (FIG. 6). The set decimal point setting pin is also released thereby.

To effect this release in the set-pin carriage 24 (FIG. 2) a shaft 80 is provided which forms one component of a bow or stirrup 79, which consists of two cranked levers 81, a side rail 82 and an upper cross bar 83. The latter coacts with a slider 84 on the key board 13 movable in the lengthways direction of the machine which enables it to act with a bent portion or branch 85 on the rod 83. With a forked slot 86 it passes over an arm 87 of a double lever 88 which is rotatably held by a pin 89 and is cranked on a push bar 91 leading in the direction of the machine drive. This push bar at the end of the machine cycle is moved towards the left (FIG. 2) so that by means of the slider 84 a deflection in a clockwise direction is imparted to the stirrup 79. The rail 82 extends below side projections 92 of the decimal point setting pin 72. The particular pin 72 which has been moved down by the decimal point setting key 12 is raised into its starting position by the stirrup 79 by means of its projection 92.

Leaving the setting of the place selector lever 14 at three places to the right of the decimal point, the second factor (1.25) is now keyed on the keyboard 1 (FIG. 1) with corresponding actuation of the decimal point setting key 12 and then operating key 9 is pressed in order to initiate the second mechanical step in the multiplication.

During the keying of the amount 1.25 the set-pin carriage 12 has advanced only by two steps after the depression of the decimal point setting key 12, so that the set decimal point setting pin 72 is still at a distance of the order of one step of the set-pin carriage from the stop 78. If the set-pin carriage is now released by the catch 26 for a further movement to the left, it will perform an additional movement of one step to the left, by which means the decimal point position is brought into line with the decimal point position set in the printing unit by the position setting lever 14.

This mechanical cycle covers the automatic printing of the second factor and the multiplication between the two factors as well as the return of the set-pin carriage to its resting position.

If, subsequently the product formed by obtaining the sum from the totalizer is then automatically printed, then during this process, the set-pin carriage is not working but the product is transferred directly from the totalizer into the actuating elements and printed, during which time the required decimal point position in the product referred to the decimal point position of the factors has moved to the left by the number of places to which the position setting lever was set. In this connection it should be borne in mind that the number of places to the right of the decimal point in the product is equal to the sum of the numbers of the places occurring in the factors introduced in the machine. This number amounts to six, since one place was added to the second factor.

In order to correct the decimal point position in the product correspondingly, the following arrangement is provided:

The setting rail 49 (FIG. 6) is extended upwards beyond the pin 55 and at the end is fitted with a stepped stop in the form of two stop faces 93, 94, with which coacts the left, bent end 95 of a driving pawl 96, which by means of a lug 97 engages with teeth 98 on the lower edge of the locking plate 62 (cf. also FIG. 7). The pawl 96 is hinged by the pin 99 to a cranked lever 101 which is placed on the pin 57. The driving pawl is held by a pin 102 on a stop face 103 of the lever 101 by the action of a spring 105 extending between the pin 102 and a pin 104 on the setting rail 49.

As a rule the left arm 106 of the cranked lever 101 is held in locked position by a locking lever 107 (FIG. 5) carried on a fixed pin 108 and is normally held in engagement with the arm 106 of the lever 101 by a spring 109 acting on its lower arm.

In a shaft 111 (FIG. 5) a roller tappet 112 is positioned, the roller of which runs on a cam plate 114 fixed on the principal driving shaft. On rotation of the shaft 113, the arm 106 (FIG. 7) after the latter has been swung out, is returned to its starting position by the roller lever 112.

Furthermore, an angle lever 116 is positioned on a shaft 115 (FIG. 5) which is controlled by a spring 117 drawing it in a clockwise direction. A connecting rod 118 is pivoted to this lever by a pin 119 which at a given time is caused by the drive mechanism of the machine to swing the lever in a counterclockwise direction against the action of the spring 117 and holds it back.

A pawl 121 is positioned on the pin 119 to which is connected the other end of the spring 109. By means of this spring, the pawl 121 with the left side of a cut out 122 is drawn against a pin 123. The pawl 121 coacts through a finger 124 with a branch or bent back portion 125 of the locking lever 107. This arrangement is for the purpose of releasing the lock preventing the angle lever 101 (FIG. 7) from rotating in a counterclockwise direction at a given time, in order to permit free motion towards the left by the pawl 96 to operate the locking plate 62.

Before printing of the end total by suitable controls in the driving gear, the connecting rod 118 (FIG. 5) is caused to move to the left and back, against the action of the spring 117, whereby first the finger 124 snaps to the left in front of the branch 125 so that on the return of the lever 116 it drives the branch 125 and thus the locking lever 107 in a counterclockwise direction and the locking of the lever 101 (FIG. 6) is released. By this means the driving pawl 96 is moved to the left and thereupon enters into the toothed indentation 98 located in front of it and drives the locking plate 62 to the left. The motion of the pawl 96 is thereby limited by the stepped stop 93, 94, set simultaneously by means of the place setting lever 14.

If the place selector lever 14 is set at three places to the right of the decimal point, then the locking plate has already been moved three places from the left from its starting position. From this position onwards, on engaging with the pawl 96, it is moved a further three places to the left until the bent end 95 strikes against the preset stop face 93. If the setting lever were set in the middle position then the locking plate 62 before engaging with the pawl 96 would take up a position moved one place further to the right and from this position onwards it would be moved two places to the left before the pawl struck against the stop face 94, if the cranked lever 101 is swung in a counterclockwise direction.

It is apparent from this that when the end total is formed the locking plate 62 is moved to the left by twice the setting of the setting lever 14, so that the printed total correctly contains twice as many digits or places to the right of the decimal points as one of the factors.

The lever 101, swung in a counterclock direction together with the pawl 96 moved to the left, after the printing of the total has been effected, is returned by the cam plate 114 (FIG. 5) through the roller tappet 112, so that these components are again ready for the printing of a new total to be performed.

If the place locator lever 14 is moved into its lowest position (FIG. 1) then the locking plate 62 is returned to the right through the action of the setting rail 49 (FIG. 6) and the cranked lever 56, by which means the slits or indentations are returned to a position outside the path of travel of the decimal point key bar 21 so that, by this means, the printing of the decimal point and of the comma is entirely prevented.

No specific explanation is called for of the fact that the two stepped stops 77, 78 and 93, 94 may be equipped with more than two stop faces, as desired, if it is required to extend the adjustable decimal point position over further numbers of places to the right of the decimal point.

What we claim is:

1. In a device for controlling the position of the decimal point in calculating machines, having a ten key keyboard, a set pin carriage, means for moving the latter stepwise from order to order to the left, a printing mechanism comprising ordinally arranged digit type carriers, decimal point and comma type carriers, each placed at the right side of the adjacently located digit type carrier, a locking plate having a locking edge for holding said decimal point and comma type carriers in their inactive position, cutouts in said locking edge adapted to free said decimal point and comma type carriers aligned therewith for printing, a row of decimal point set pins ordinally arranged on said set pin carriage, a decimal point setting key in said key board for depressing the decimal point set pin coordinated to the decimal point of the amount entered into said set pin carriage, a decimal setting lever for determining the place of the decimal point in the amount to be printed, connected, on the one hand, with a stepped stop for controlling the movement of the set pin carriage to the left, on the other hand, with said locking plate for aligning it by its cutouts with the decimal point and comma type carriers corresponding to the selected decimal point position, the steps of said stepped stop being adapted to be selectively brought into the path of the depressed decimal point set pin by adjusting said decimal setting lever, and having an ordinal distance from the just depressed decimal point pin corresponding to the number of places on the right of the selected decimal point position, and means for moving said set pin carriage at the termination of the entering of an amount with its depressed decimal point set pin onto the adjusted step of said stepped stop, whereby all subsequently entered amounts having a different number of places on the right of the decimal point will be printed about the same ordinal position of the decimal point, adjusted by said decimal setting lever.

2. In a device according to claim 1, means for printing the product of a multiplication of two factors, means for automatically shifting said locking plate to twice the number of places as has been done by said decimal setting lever, means for usually holding inefficient said shifting means, and means for making said shifting means efficient before the printing of the product, whereby with impressions of the multiplier and the multiplicand will be performed about the ordinal position of the decimal point set by said decimal setting lever, but the impression of the product will be performed about an ordinal place of the decimal point having the double number of places to the right of its decimal point than that of the multiplicand and the multiplier.

3. In a device according to claim 1, means for printing the product of a multiplication of two factors, means for automatically shifting said locking plate an additional number of places to the left after it has been set by said decimal setting lever comprising a driving member cooperating with said locking plate and adapted to move said locking plate along the setting direction thereof after the adjustment of said decimal setting lever, and an adjustable abutment cooperating with said driving member for limiting said additional shifting of said locking plate.

4. In a device according to claim 1, a setting rail interconnected between said decimal setting lever and said locking plate, said setting rail having a stepped abutment, a set of teeth at the locking plate, a spring loaded driving pawl cooperating with said teeth, means for holding said driving pawl in its position of rest, means for engaging said driving pawl into said teeth and for releasing it for moving said locking plate further an additional number of ordinal places limited by said stepped abutment.

5. In a device according to claim 1, and means for shifting said locking plate with its cutouts into an intermediate position, wherein the latter are out of the path of the decimal point and comma types, for preventing the impression of the decimal point on commas.

References Cited in the file of this patent

UNITED STATES PATENTS

| | | |
|---|---|---|
| 2,467,419 | Avery | Apr. 19, 1949 |
| 2,773,646 | Mathi | Dec. 11, 1956 |

FOREIGN PATENTS

| | | |
|---|---|---|
| 515,777 | Italy | Feb. 16, 1955 |